UNITED STATES PATENT OFFICE.

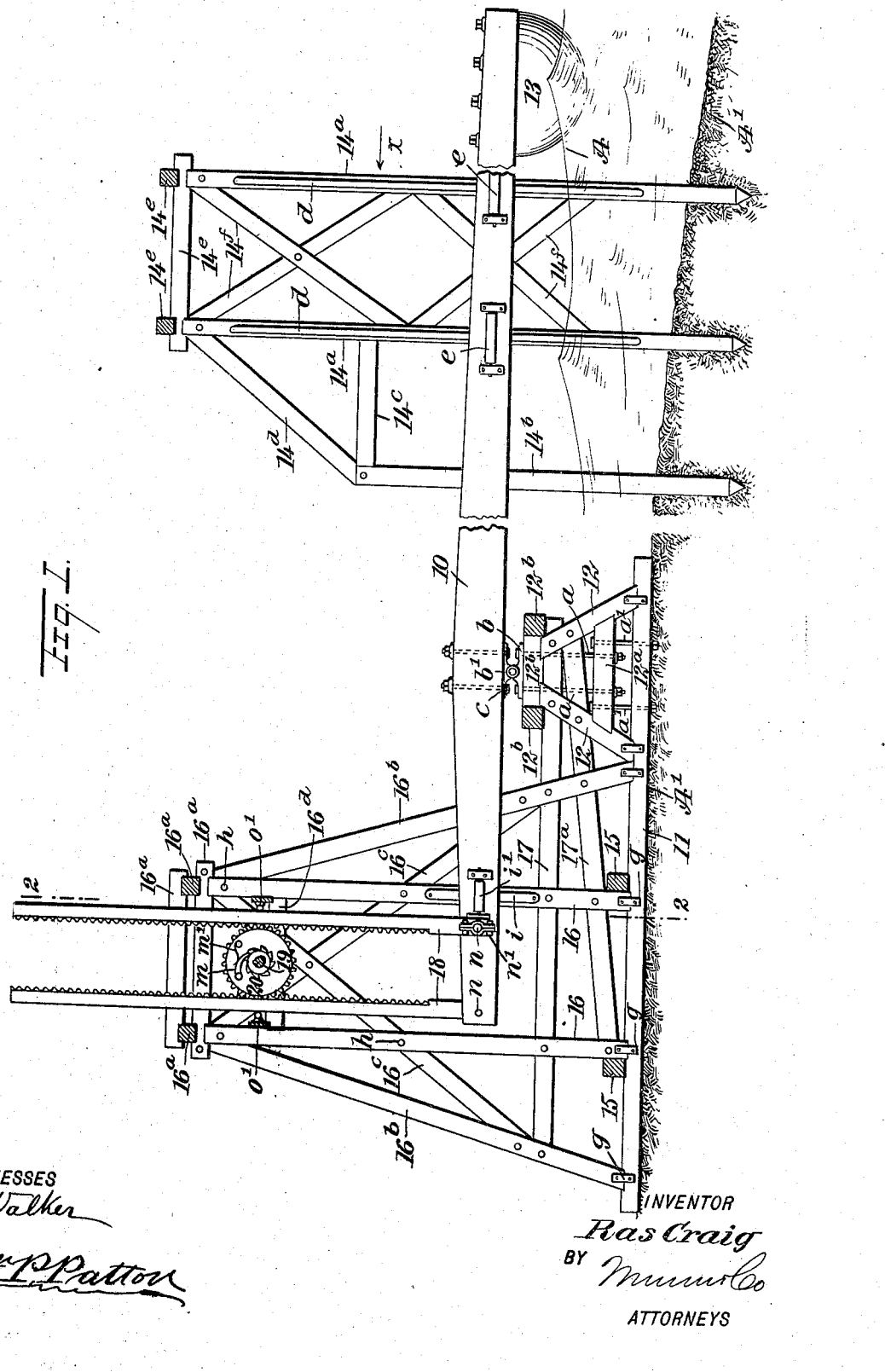

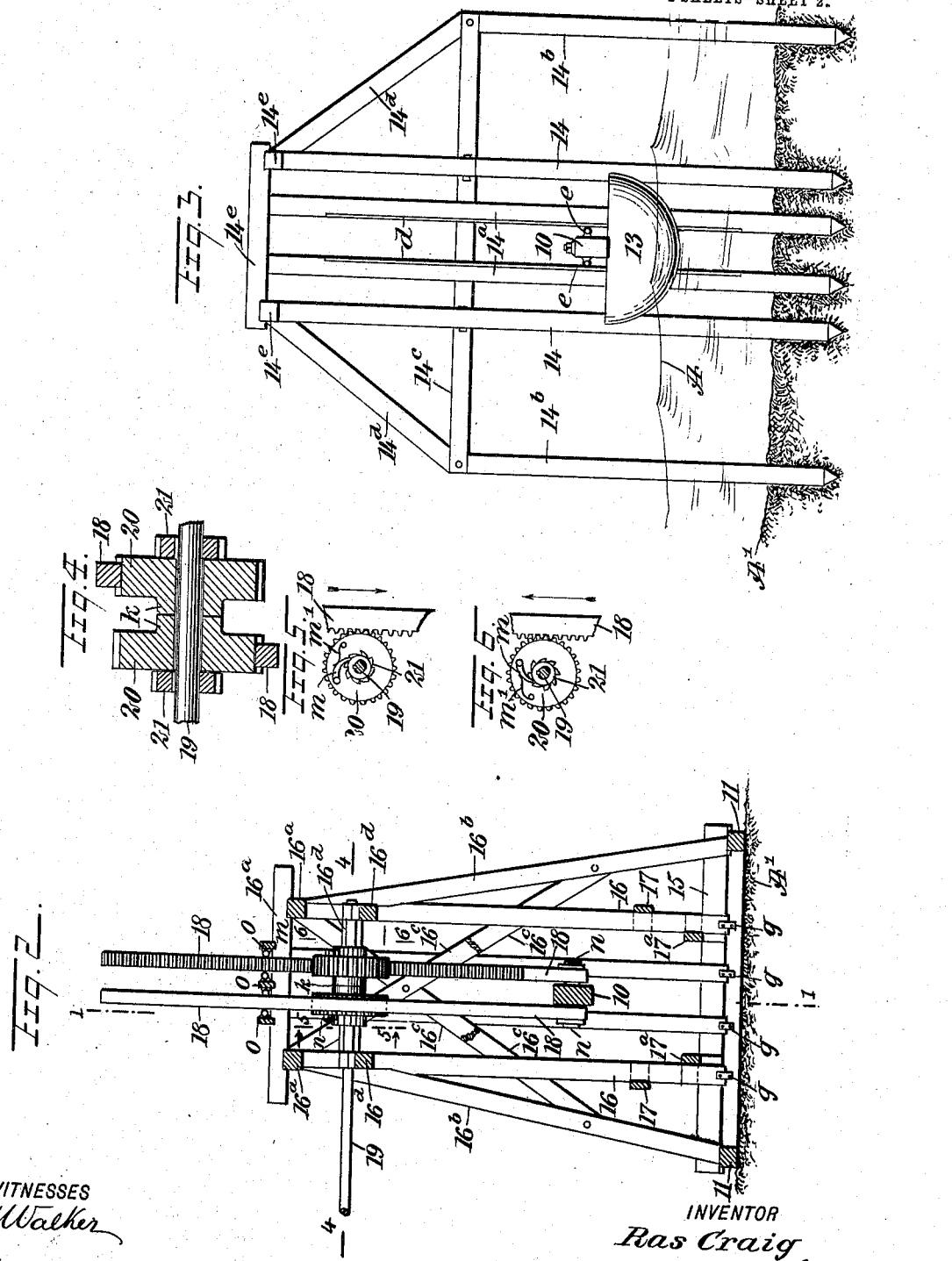

RAS CRAIG, OF LOS ANGELES, CALIFORNIA.

WAVE-MOTOR.

No. 899,957.  Specification of Letters Patent.  Patented Sept. 29, 1908.

Application filed April 29, 1908. Serial No. 429,827.

*To all whom it may concern:*

Be it known that I, RAS CRAIG, a citizen of the United States, and a resident of Los Angeles, in the county of Los Angeles and State of California, have invented a new and Improved Wave-Motor, of which the following is a full, clear, and exact description.

This invention relates to motors devised for utilizing the force developed by the rise and fall of waves of the sea or other body of water.

The purpose of the invention is to provide novel details of construction for a wave motor, which when assembled in a concrete apparatus, effect the positive and continuous conversion of the force of waves during their rise and fall, into rotary motion of a driven shaft for the actuation of other mechanism.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 represents a partly sectional and broken side view of the improved motor erected on a beach and having a portion thereof immersed in a body of water for actuation by waves thereof, the section being defined by the line 1—1 in Fig. 2; Fig. 2 is a transverse sectional view, substantially on the line 2—2 in Fig. 1; Fig. 3 is an end view of the wave motor seen in the direction of the arrow $x$ in Fig. 1; Fig. 4 is an enlarged sectional plan view of details, substantially on the line 4—4 in Fig. 2; Fig. 5 is a transverse sectional view of parts, substantially on the line 5—5 in Fig. 2; and Fig. 6 is a transverse sectional view, substantially on the line 6—6 in Fig. 2.

As the motor is specially adapted for utilizing the impact of waves of a sea or ocean, it is necessarily erected on the beach of such a body of water, as is indicated at A in the drawings.

The preferred form of structural supports for the operating mechanism, consists of three frames erected in sequence on the beach A', and which for convenience may be respectively designated a guide frame, that is in the water, a fulcrum supporting frame next to the guide frame, and a tower frame that supports the mechanism employed for the conversion of reciprocating motion into continuous rotary motion, as will hereinafter be fully described.

A principal detail of the invention is the form of an elongated power lever 10 that is rockably supported on the fulcrum frame at a suitable distance from the ends thereof. To insure stability, a strong skeleton frame is provided for a fulcrum base, consisting essentially in the provision of sill beams 11 on the end portions of which are erected posts 12, four in number, two appearing in Fig. 1. The posts 12 all incline toward each other and are spaced apart by horizontal timbers $12^a$ near their lower ends, and cap timbers $12^b$ that are seated on the upper ends thereof, these horizontal timbers being bound together by bolts $a, a'$. Upon the cap timbers, pedestal blocks, such as $b$ are mounted and secured, and upon the lower side of the power lever 10, a similar block $b'$ is secured by bolts, these paired blocks being hinged together, as shown at $c$, which adapts the power lever for rocking movement on its fulcrum support. Upon the outer end of the lever 10, that extends over the body of water A, a hollow float 13 is secured, which is semi-globular in form, is of proper dimensions for effective service, and is hermetically sealed by a water-tight cover.

The guide frame structure, comprises a plurality of vertical stanchions 14, these stanchions being arranged to produce a rectangular structure and at their lower ends, are sharpened to permit said ends to be driven down into the ground near the body of water which receives the float 13. Of the vertical stanchions mentioned, there are two pairs $14^a$ which are positioned so as to receive the power lever 10 between them, and upon the inner or adjacent surfaces of each pair of said stanchions, a vertical guide $d$ is secured upon each, these pairs of guides receiving the impingement of anti-friction rollers $e$ that are mounted upon the opposite sides of the power lever 10, and thus give lateral support thereto. The guide frame is preferably reinforced by other vertical posts $14^b$ that are erected nearest the fulcrum supporting frame, and at the upper ends thereof, are joined to horizontal beams $14^c$ which are also secured upon the stanchions 14. From the upper ends of the posts $14^b$, braces $14^d$ incline toward the upper ends of the stanchions 14 at each side of the rectangular guide frame and are joined thereto, said upper ends, together with the like ends on the stanchions 14ª, being connected together by cap timbers 14ᵉ. The stanchions 14ª may be further reinforced by the crossed braces 14ᶠ that are secured thereon at their ends.

The tower frame comprises a base frame in rectangular form, timbers 15 of which are seated and secured upon the sill beams 11, which have been rearwardly extended from the fulcrum frame already described. Furthermore, the tower frame consists of a plurality of vertical posts 16, which are erected from the sill beams 11 and base frame timbers 15, whereon the lower ends of the posts are secured by strap plates g or similar means. Upon the upper ends of the posts 16, a top frame is formed by the rectangular disposition of a plurality of similar timbers 16ª, which are framed together and secured upon said posts. The vertical posts 16 are supported laterally on four sides by inclined prop braces 16ᵇ, which have their upper ends attached upon the top frame timbers 16ª, and at their lower ends are secured upon the sill beams 11 by strap plates g or equivalent means. The vertical posts 16 and inclined braces 16ᵇ, are reinforced by crossed braces 16ᶜ which are secured by their ends on the posts and braces, and also where they lap upon each other and upon the posts 16 by bolts h as shown in Fig. 1.

To increase the rigidity of the framed structures which are mounted upon the sill beams 11, tie bars 17, 17ª are extended from the posts 16 and braces 16ᵇ of the tower frame, whereon said tie bars are secured, to lap upon the posts 12 of the fulcrum supporting frame whereon they are bolted, as shown in Fig. 1.

The innermost end of the power lever 10, passes between a pair of the vertical frame posts 16 and is laterally supported by guides i that are secured vertically on said posts, and are loosely engaged by rollers i' that project from the sides of the lever toward said guides. The power lever extends at its inner and shorter end, a sufficient distance beyond the vertical posts having the guides i thereon, to permit the loose connection of two similar gear racks 18 thereon respectively on the opposite sides of the lever. Upon the opposite vertical posts 16, that are joined together a short distance below their upper ends by a cross timber 16ᵈ, a driven shaft 19 is rotatably supported in a horizontal plane, and may be extended any suitable length beyond the tower frame, as shown in Fig. 2. Upon the shaft 19, adjacent to each other, two similar spur gears 20, 20, are loosely mounted and are spaced apart by the true ends of their hubs k, which have contact with each other, as shown in Figs. 2 and 4. On the driven shaft 19, at the opposite side of each spur gear 20, a ratchet wheel 21 is secured, these ratchet wheels having a loose, lateral contact with the spur gears.

As shown in Figs. 5 and 6, upon each spur gear 20 at its outer side, a pawl m is pivoted so that its toe may engage a respective ratchet wheel 21, and this engagement is enforced by a spring m' on each spur gear which presses upon an adjacent pawl. It will be noted in Figs. 5 and 6, that the teeth of the ratchet wheels 21 incline in opposite directions for a purpose that will presently be explained.

As before mentioned, the gear racks 18, 18, are located at their lower ends on the opposite sides of the power lever 10; and as is shown for one rack in Fig. 1, a wrist pin n is projected from the side of the power lever and loosely engaged by a coupling box n' that is fixed on the lower end of a respective gear rack. The space between the lower ends of the racks 18 is nearly the same as that between the spur gears 20, and as the racks are erected in vertical planes as shown in Figs. 1 and 2, the teeth on each rack are adapted for engagement with a respective spur gear, and to permit said racks to assume parallel planes when so engaged at the opposite sides of the gears 20, the space between the pivot connections of the racks with the power lever should be approximately equal with the diameter of each spur gear, this being shown in Fig. 1. Upon one of the cross timbers 16ª of the top frame for the tower frame, bracket boxes o are secured, each box carrying an anti-friction roller that loosely contacts with an adjacent side of a respective gear rack 18, as shown in Fig. 2, these rollers serving to prevent a lateral displacement of the racks, a similar roller being positioned between the racks to prevent them from crowding toward each other. On appropriate upright posts 16, adjacent to the rear sides of the racks 18, bracket-supported anti-friction rollers o' are mounted and loosely contact with said rear sides of the gear racks, which will permit the racks to freely reciprocate in engagement with the spur gears 20, but prevent the racks from disengaging from said gears, this provision appearing in Fig. 1.

It is to be understood that the length of the power lever 10 and its extent over the body of water A, will permit the hemispherical float 13 to rest on the water, and rise and fall with the corresponding wave action; and it should be further explained that the bulbous shape given to the shell of the float, insures the vertical movements thereof, whether the waves impinge laterally on any portion thereof or simply raise the float by an upward impulse of the waves.

The relative proportion of the details of the apparatus is such, that the oscillations of the power lever 10, due to the successive impulses communicated thereto by the succession of waves, will be transmitted through the gear racks 18 to the spur gears 20.

As the pawls m, carried by the spur gears 20, engage with the teeth of the ratchet wheels 21, which trend in opposite directions and co-act with the gears for turning the shaft 19 always in the same direction, it will be obvious that the reciprocation of the racks 18, due to the oscillations of the power lever 10, will give continuous rotary motion to the shaft, while the water A is agitated by a succession of waves.

In further explanation, it will be seen that upon the inner end of the power lever receiving an upward impulse, one rack, shown in Fig. 6, will by turning the spur gear it is meshed with, also turn the corresponding ratchet wheel 21, due to the pawl m on said gear interlocking with the teeth of the ratchet wheel, and this rotary motion will continue while the rack is moved upward.

Inspection of Fig. 1 will show that the described operation of the rack, gear and ratchet wheel, is produced by the preponderance of weight had by the long arm of the power lever 10 when a wave is receding and the float 13 descends a corresponding degree.

When the next wave impulse commences to elevate the float 13 and the outer end of the power lever, the gear 20, shown in Fig. 5, that engages with the other rack and that had been dormant, due to the slipping of the pawl over the adjacent ratchet wheel, now becomes active, as said pawl will interlock with the teeth of the ratchet wheel, as is shown in Fig. 5 and continue the rotary movement of the shaft 19. It will be apparent that the support of the power lever 10 at a point much nearer to the racks than to the float, gives increased leverage to the longer member of the lever, and a corresponding increase in power for the short member thereof, which is transmitted to the shaft 19 by the means hereinbefore described.

Having thus described my invention, I claim as new and desire to secure by Letters Patent:

1. A wave motor, comprising a guide frame, provided with guides, a tower frame provided with guides, a fulcrum supporting frame intermediate the guide frame and the tower frame and connected with the tower frame, a power lever hinged on the fulcrum supporting frame, and loosely engaging the guides on the guide frame, and the guides on the tower frame, a float on the outer end of the power lever, a shaft journaled on the tower frame, and a connection between the inner end of the power lever and the shaft for rotating the shaft in one direction when the lever is oscillated.

2. A wave motor comprising a guide frame provided with guides, a tower frame provided with guides, a fulcrum supporting frame intermediate the guide frame and the tower frame, a power lever hinged on the fulcrum supporting frame, and loosely engaging the guides on the guide frame, and the guides on the tower frame, a float on the outer end of the power lever, a shaft journaled on the tower frame, and a connection between the inner end of the power lever and the shaft for rotating the shaft in one direction when the lever is oscillated.

3. A wave motor, embodying a guide frame erected on the shore of a body of water, a fulcrum supporting frame near the guide frame, a tower frame connected with the fulcrum supporting frame, an elongated power lever hinged on the fulcrum supporting frame and loosely engaging the guides on the guide frame and also on the tower frame, a float on the outer end of the power lever, a rotatable supported shaft on the tower frame, means mounted on the inner end of the lever, and co-acting means on the tower frame and shaft, adapted for the rotation of the shaft in accord with the oscillations of the power lever.

4. In a wave motor, an elongated lever, a support for the lever near one end thereof, a hinged connection between the lever and said support, a hemispherical float on the longer end of the lever, lateral guides for the lever, a rotatably supported shaft, and mechanism connecting the shorter end of the lever with the shaft which converts the oscillations of the lever into rotary motion of the shaft.

5. In a wave motor, a lever, a support for the lever near one end thereof, a hinged connection between the lever and the support, a float on the longer end of the lever, lateral guides for the lever, a rotatably supported shaft, and mechanism connecting the shorter end of the lever with the shaft which converts the oscillations of the lever into rotary motion of the shaft.

In testimony whereof I have signed my name to this specification in the presence of two subscribing witnesses.

RAS CRAIG.

Witnesses:
F. D. DUTTON,
A. E. BUMMER.